(12) United States Patent
Ban

(10) Patent No.: US 12,739,414 B2
(45) Date of Patent: Sep. 15, 2026

(54) VIDEO SOURCE TRANSMISSION APPARATUS AND METHOD, AND COMPUTER STORAGE MEDIUM

(71) Applicant: AMLOGIC (SHANGHAI) CO., LTD., Shanghai (CN)

(72) Inventor: Yinlong Ban, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 107 days.

(21) Appl. No.: 18/761,300

(22) Filed: Jul. 1, 2024

(65) Prior Publication Data

US 2025/0080761 A1 Mar. 6, 2025

(30) Foreign Application Priority Data

Sep. 4, 2023 (CN) ........................ 202311134044.9

(51) Int. Cl.
*H04N 19/423* (2014.01)
*H04N 7/01* (2006.01)
*H04N 7/10* (2006.01)
*H04N 19/136* (2014.01)

(52) U.S. Cl.
CPC ............. *H04N 19/423* (2014.11); *H04N 7/01* (2013.01); *H04N 7/10* (2013.01); *H04N 19/136* (2014.11)

(58) Field of Classification Search
CPC ...... H04N 19/423; H04N 19/136; H04N 7/01; H04N 7/10
See application file for complete search history.

(56) References Cited

U.S. PATENT DOCUMENTS

2017/0026694 A1* 1/2017 Bai ...................... H04N 21/845
2019/0335138 A1* 10/2019 Cheng .................. H04N 23/741
2020/0396098 A1* 12/2020 Shinar .................... G08C 17/02

FOREIGN PATENT DOCUMENTS

CN 101692693 A * 4/2010
CN 103501436 B * 9/2016
CN 111988244 B * 10/2022 ............. H04L 47/62
WO WO-2021218527 A1 * 11/2021 ............. H04N 23/65

OTHER PUBLICATIONS

Translation of CN-101692693-A (Year: 2010).*
Translation of CN-103501436-B (Year: 2016).*
Translation of CN-111988244-B (Year: 2020).*
Translation of WO-2021218527-A1 (Year: 2021).*

* cited by examiner

*Primary Examiner* — Henry Tsai
*Assistant Examiner* — John B Roche

(57) ABSTRACT

The disclosure discloses a video source transmission apparatus, a video source transmission method and a computer storage medium. The video source transmission apparatus includes: a video source acquisition module configured to capture video sources in multiple formats; a video source transmission module configured to transmit a video source; a control module connected with the video source acquisition module and the video source transmission module, the control module being configured to: obtain a video source to be transmitted from the video sources in multiple formats; buffer the video source to be transmitted in a circular queue; and control, after receiving a transmission control instruction, the video source transmission module to sequentially transmit the video source to be transmitted in the circular queue.

17 Claims, 4 Drawing Sheets

VIDEO SOURCE TRANSMISSION APPARATUS AND METHOD, AND COMPUTER STORAGE MEDIUM

CROSS REFERENCE OF RELATED APPLICATION

The application claims the priority of the Chinese patent application No. 202311134044.9 entitled "VIDEO SOURCE TRANSMISSION APPARATUS AND METHOD, AND COMPUTER STORAGE MEDIUM" and filed by Amlogic (Shanghai) Co., Ltd. on Sep. 4, 2023, which is hereby incorporated by reference in its entirety.

TECHNICAL FIELD

The present disclosure relates to the technical field of apparatuses for transmitting video sources, more particularly, to a video source transmission apparatus, a video source transmission method and a computer storage medium.

BACKGROUND

In related technologies, a ping-pong buffering mechanism is used to achieve the transmission of a video source. That is, each video frame in the video source is allocated to two data buffer regions, and is transmitted to a USB Video Class (UVC) channel through two data buffer regions, and then is written into two data buffer regions. However, with the transmission method of the video frames mentioned above, it is difficult for the video frames to be written into data buffer regions timely when the UVC channel quickly obtains the video source in data buffer regions, resulting in the problem of video source lagging. Furthermore, it causes the problem of video source loss when the UVC channel reads slowly the video source in the data buffer regions.

SUMMARY

The present disclosure aims to address at least one of the technical problems existing in the related art. Therefore, one purpose of the present disclosure is to propose a video source transmission apparatus that can achieve video source transmission through a circular queue, thereby avoiding the problems of video source lag and loss caused by the influence of a reading speed.

A second purpose of the present disclosure is to propose a video source transmission method.

A third purpose of the present disclosure is to propose a non-transitory computer storage medium.

In order to solve the above problems, an embodiment in a first aspect of the present disclosure provides a video source transmission apparatus. The video source transmission apparatus includes: a video source acquisition module configured to capture video sources in multiple formats; a video source transmission module configured to transmit a video source; and a control module connected with the video source acquisition module and the video source transmission module. The control module being configured to: obtain a video source to be transmitted from the video sources in multiple formats; buffer the video source to be transmitted in a circular queue; and control, after receiving a transmission control instruction, the video source transmission module to sequentially transmit the video source to be transmitted in the circular queue.

According to the video source transmission apparatus of the embodiment of the disclosure, during the process of the video source transmission apparatus transmitting the video source to be transmitted to an external host device, the control module writes the video frames in the video source to be transmitted into a circular queue, and then transmits the buffered video frames in the circular queue to the external host device. In other words, when the control module transmits the video source to be transmitted, it no longer buffers the video frames of the video source to be transmitted in two data buffer regions, but writes the video frames in the video source into the circular queue, and adaptively adjusts the speed of writing the video frames into the circular queue in consideration of the reading speed of the external host device. Therefore, compared to the method of realizing video source transmission through the ping-pong buffering mechanism, the video source transmission apparatus in the present disclosure adaptively adjusts the speed of writing video frames into the circular queue in consideration of the reading speed, so that the video frames buffered in the circular queue will not be saturated or insufficient, so as to avoid the problems of video source lag and loss caused by the influence of reading speed.

In some embodiments, the control module includes: a video source management unit connected with the video source acquisition module, the video source management unit being configured to manage the video sources in multiple formats captured by the video source acquisition module; a service management unit connected with the video source management unit, the service management unit being configured to obtain the video source to be transmitted from the video sources in multiple formats based on a target video format selected by a user, and to buffer the video source to be transmitted in the circular queue; and a transmission management unit connected with the service management unit and the video source transmission module, the transmission management unit being configured to control, after receiving the transmission control instruction, the video source transmission module to sequentially transmit the video source to be transmitted in the circular queue.

In some embodiments, the target video format includes at least a dynamic image, a static image, and a static video file.

In some embodiments, the service management unit further includes a queue management subunit connected to the video source management unit, and the queue management subunit is configured to. obtain a transmission control parameter; write sequentially each video frame in the video source to be transmitted into a tail of the circular queue and buffer the video frame based on the transmission control parameter; start transmitting sequentially the buffered video frames from a head of the circular queue, until receiving a stop transmission control instruction; and stop, based on the stop transmission control instruction, writing into the circular queue and clear the video source to be transmitted in the circular queue.

In some embodiments, the service management unit further includes an encoding management subunit, the transmission control parameter includes a target video encoding format, and the encoding management subunit is configured to: obtain the target video encoding format selected by the user; obtain one or more supported video encoding formats of the video source transmission apparatus; determine presence of the target video encoding format in the one or more supported video encoding formats; and encode the video source to be transmitted based on the target encoding format.

In some embodiments, the service management unit further includes a driver management subunit configured to control an open-closed status of a video channel after receiving the transmission control instruction.

In some embodiments, the video channel is a USB VIDEO CLASS (UVC) channel.

In some embodiments, the transmission management unit is further configured to execute, before receiving the transmission control instruction, apparatus enumeration instruction to detect an external host device connected to the video source transmission apparatus and to receive a transmission control parameter provided by the external host device.

In some embodiments, the video source transmission apparatus further includes a data transmission interface having one end that is connected to the control module, and another end that is suitable to be connected to an external host device through a data connection cable.

In some embodiments, the data transmission interface is a USB transmission interface.

An embodiment in a second aspect of the present disclosure provides a video source transmission method. The video source transmission method includes: obtaining a video source to be transmitted from video sources in multiple formats; buffering the video source to be transmitted in a circular queue; and sequentially transmitting the video source to be transmitted in the circular queue after receiving a transmission control instruction.

According to the video source transmission method of the embodiment of the disclosure, during the process of the video source transmission apparatus transmitting the video source to be transmitted to an external host device, the video frames in the video source to be transmitted are written into a circular queue, and then the buffered video frames in the circular queue are transmitted to the external host device. In other words, when the video source to be transmitted is transmitted, it no longer buffers the video frames of the video source to be transmitted in two data buffer regions, but writes the video frames in the video source into the circular queue, and adaptively adjusts the speed of writing the video frames into the circular queue in consideration of the reading speed of the external host device. Therefore, compared to the method of realizing video source transmission through the ping-pong buffering mechanism, the video source transmission apparatus in the present disclosure adaptively adjusts the speed of writing video frames into the circular queue in consideration of the reading speed, so that the video frames buffered in the circular queue will not be saturated or insufficient, so as to avoid the problems of video source lag and loss caused by the influence of reading speed.

In some embodiments, said buffering the video source to be transmitted in the circular queue and said sequentially transmitting the video source to be transmitted in the circular queue, include: obtaining a transmission control parameter; writing sequentially each video frame in the video source to be transmitted into a tail of the circular queue and buffering the video frame based on the transmission control parameter; starting transmitting sequentially the buffered video frames from a head of the circular queue, until receiving a stop transmission control instruction; and stopping, based on the stop transmission control instruction, writing into the circular queue and clearing the video source to be transmitted in the circular queue.

In some embodiments, said obtaining the video source to be transmitted from the video sources in the multiple formats includes: obtaining a target video format selected by a user; and obtaining the video source to be transmitted from the video sources in the multiple formats based on the target video format.

In some embodiment, obtaining the video source to be transmitted, includes: obtaining a target video encoding format selected by a user; obtaining an initial video source and one or more supported video encoding formats of the video source transmission apparatus; determining presence of the target video encoding format in the one or more supported video encoding formats; and encoding the video source to be transmitted based on the target encoding format and determining the coded initial video source as the video source to be transmitted.

In some embodiments, the method further includes: sequentially transmitting, via a USB VIDEO CLASS (UVC) channel, the video source to be transmitted in the circular queue.

In some embodiments, the method further includes: obtaining a transmission state of the video source to be transmitted; and controlling, after determining that the transmission state is abnormal, a UVC channel to be closed to stop the transmission of the video source to be transmitted.

In some embodiments, the method further includes: before receiving the transmission control instruction executing apparatus enumeration instruction to detect an external host device connected to the video source transmission apparatus; and receiving a transmission control parameter provided by the external host device.

An embodiment in a fourth aspect of the present disclosure provides a non-transitory computer storage medium having a computer program stored thereon. The computer program when executed by a processor implements the video source transmission method described in the any of above embodiments.

The additional aspects and advantages of the present disclosure will be partially provided in the following description, which will become apparent from the following description, or will be understood through the practice of the present disclosure.

BRIEF DESCRIPTION OF DRAWINGS

The above and/or additional aspects and advantages of the present disclosure will become apparent and readily appreciated from the following description of embodiments, taken in conjunction with the accompanying drawings, in which.

REFERENCE NUMERALS

Figure 1:
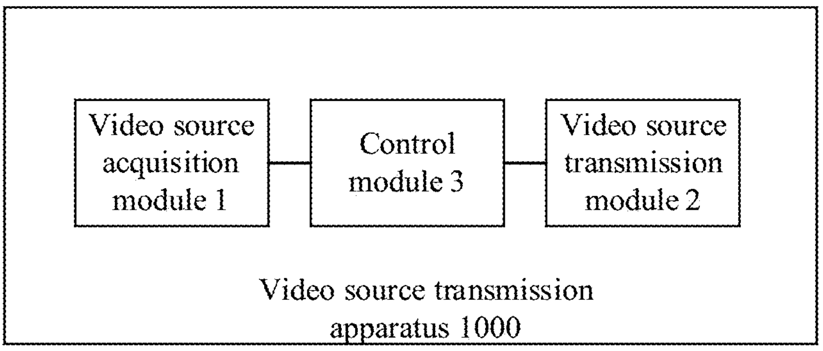
FIG. 1 is a structural block diagram of a video source transmission apparatus according to an embodiment of the present disclosure.

Video source transmission apparatus 1000;

Video source acquisition module 1; Video source transmission module 2; Control module 3; USB device end 6; UVC service station 5; External host device 7; USB connection cable 8; Video source management unit 31; Service management unit 32; Transmission management unit 33; Queue management subunit 321.

DESCRIPTION OF EMBODIMENTS

Embodiments of the present disclosure will be described in detail below, and the embodiments described with reference to the accompanying drawings are exemplary. The embodiments of the present disclosure will be described in detail below.

In order to solve the above problems, a video source transmission apparatus is provided in an embodiment in a first aspect of the present disclosure. The video source transmission apparatus can realize video source transmission through a circular queue, so as to avoid the problem of video source lag and loss caused by the influence of the reading speed.

A video source transmission apparatus 1000 according to an embodiment of the present disclosure will be described below with reference to FIG. 1. As shown in FIG. 1. the video source transmission apparatus includes a video source acquisition module 1, a video source transmission module 2, and a control module 3.

The video source acquisition module 1 is configured to capture video sources in multiple formats. The video source transmission module 2 is configured to transmit a video source. The control module 3 is connected with the video source acquisition module 1 and the video source transmission module 2.

The control module 3 is configured to perform the following operations.

Firstly, the control module 3 obtains a video source to be transmitted from the video sources in multiple formats.

Specifically, the video source acquisition module 1 captures in real-time video sources in multiple formats, or the video source acquisition module 1 stores video sources in multiple formats. The format of the video source can be static or dynamic image data, video data or an image file or a video file etc., there is no restriction on this. The control module obtains the video source to be transmitted from the video sources in multiple formats.

Then, the control module 3 buffers the video source to be transmitted in a circular queue.

Specifically, during the video source transmission apparatus is transmitting the video source to an external host device 7, the control module 3 writes video frames in the video source to be transmitted into a circular queue.

Finally, after receiving a transmission control instruction, the control module 3 controls the video source transmission module to sequentially transmits the video source to be transmitted in the circular queue.

Specifically, in related technologies, a ping-pong buffering mechanism is used to achieve the transmission of a video source. That is, each video frame in the video source is allocated to two data buffer regions, and is transmitted to a USB Video Class (UVC) channel established by a video source transmission apparatus and an external host device through two data buffer regions, and then is written into two data buffer regions. However, with the transmission method of the video frames mentioned above, it is difficult for the video frames to be written into the data buffer regions timely when the UVC channel quickly obtains the video source in the data buffer regions, resulting in the problem of video source lagging. Furthermore, it causes the problem of video source loss when the UVC channel reads slowly the video source in the data buffer regions. In order to solve this problem, in the present disclosure, the video source to be transmitted is buffered in the form of a circular queue, and the video source to be transmitted in the circular queue is transmitted sequentially, instead of buffering the video source through the data buffer regions, so as to avoid the problem of video source lag and loss caused by the influence of reading speed. That is to say, after the video source transmission apparatus receives the transmission control instruction input by the user through the external host device 7, the video source transmission apparatus transfers the video source to the external host device 7, that is, the video frames in the video source to be transmitted are written into the circular queue, and then the video source to be transmitted in the circular queue is sequentially transmitted to the external host device 7. During the transmission process, after the video frames in the video source to be transmitted in the circular queue are transmitted, the remaining video frames in the video source to be transmitted are written into the circular queue. When the external host device 7 reads the video frames quickly, it increases the speed at which the video frames are written to the circular queue. When the external host device 7 reads the video frames slowly, it slows down the speed at which the video frames are written to the circular queue. In this way, the video frames buffered in the circular queue will not become saturated or insufficient. Therefore, compared to the method of realizing video source transmission through the ping-pong buffering mechanism in which two data buffer regions are used to buffer the video source to be transmitted, the video source transmission in this application is realized through circular queue, so that the speed at which video frames are written into the circular queue can be adjusted adaptively in consideration of the reading speed and the video frames buffered in the circular queue will not be saturated or insufficient so as to avoid the problems of video source lag and loss caused by the influence of reading speed and to improve the work efficiency and flexibility, facilitate the rapid docking of development utility programs. In addition, the memory can be reused when the video source is buffered in the circular queue, which is conducive to saving memory space and to maximize the threading efficiency of video source transmission. In addition, a circular queue is a queue that reuses queue space, and the head and the tail of the circular queue are connected. The video source transmission apparatus can be a terminal, a camera device, or another device with a camera, and there is no restriction on this According to the video source transmission apparatus of the embodiment of the disclosure, during the process of the video source transmission apparatus transmitting the video source to be transmitted to an external host device 7, the control module 3 writes the video frames in the video source to be transmitted into a circular queue, and then transmits the buffered video frames in the circular queue to the external host device 7. In other words, when the control module 3 transmits the video source to be transmitted, it no longer buffers the video frames of the video source to be transmitted in two data buffer regions, but writes the video frames in the video source into a circular queue, and adaptively adjusts the speed of writing the video frames into the circular queue in consideration of the reading speed of the external host device 7. Therefore, compared to the method of realizing video source transmission through the ping-pong buffering mechanism, the video source transmission apparatus in the present disclosure adaptively adjusts the speed of writing video frames into the circular queue in consideration of the reading speed, so that the video frames buffered in the circular queue will not be saturated or insufficient, so as to avoid the problems of video source lag and loss caused by the influence of reading speed.

Figure 2:
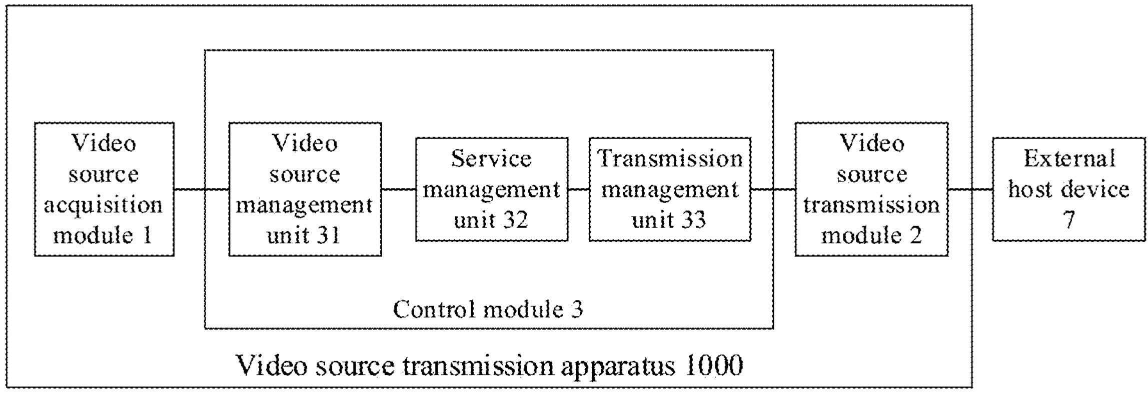
FIG. 2 is a structural block diagram of a video source transmission apparatus according to another embodiment of the present disclosure.

In some embodiments, as shown in FIG. 2, the control module 3 includes a video source management unit 31, a service management unit 32, and a transmission management unit 33. The video source management unit 31 is connected with the video source acquisition module 1. The video source management unit 31 is configured to manage the video sources in multiple formats captured by the video source acquisition module 1. The service management unit 32 is connected with the video source management unit 31. The service management unit 32 is configured to obtain the video source to be transmitted from the video sources in the multiple formats based on a target video format selected by a user, and to buffer the video source to be transmitted in the circular queue. The transmission management unit 33 is connected with the service management unit 32 and the video source transmission module 2. The transmission management unit 33 is configured to control, after receiving the transmission control instruction, the video source transmission module 2 to sequentially transmit the video source to be transmitted in the circular queue.

Specifically, the video source management unit 31 receives video sources in various formats that are captured by the video source acquisition module 1. The service management unit 32 receives a target video format selected by a user using an external host device 7 to obtain the video source to be transmitted from the video sources in the multiple formats that are captured by the video source acquisition module 1, and buffers the video source to be transmitted in the circular queue, i.e., writes the video frames in the video source to be transmitted into the circular queue. After receiving the transmission control instruction, the transmission management unit 33 controls the video source transmission module 2 to sequentially transmit the video source to be transmitted in the circular queue. During the transmission process, after the video frames in the video source to be transmitted in the circular queue are transmitted, the remaining video frames in the video source to be transmitted are written into the circular queue. When the external host device 7 reads the video frames quickly, it increases the speed at which the video frames are written into the circular queue. When the external host device 7 reads the video frames slowly, it slows down the speed at which the video frames are written into the circular queue, so that the video frames buffered in the circular queue will not become saturated or insufficient. Therefore, compared to the method of realizing video source transmission through the ping-pong buffering mechanism in which two data buffer regions are used to buffer the video source to be transmitted, the video source transmission in this application is realized through circular queue, so that the speed at which video frames are written into the circular queue can be adjusted adaptively in consideration of the reading speed and the video frames buffered in the circular queue will not be saturated or insufficient so as to avoid the problems of video source lag and loss caused by the influence of reading speed and to improve the work efficiency and flexibility, facilitate the rapid docking of development utility programs. In addition, the memory can be reused when the video source is buffered in the circular queue, which is conducive to saving memory space and to maximize the threading efficiency of video source transmission. In addition, a circular queue is a queue in which the queue space is reused, and the head and tail of the circular queue are connected.

In some embodiments, the target video format includes at least a dynamic image, a static image, and a static video file. That is to say, the target video format selected by the user through the external host device 7 is a dynamic image, a static image, or a static video file. The video source management unit 31 obtains the target video format selected by the user through the external host device 7, and obtains, based on the target video format selected by the user, the video source to be transmitted in the corresponding video format from the video sources in the multiple formats. For example, if the target video format selected by the user is a dynamic image, the video source management unit 31 obtains a dynamic image from video sources in multiple formats and uses the dynamic image as the video source to be transmitted. In addition, a static video file can be an Element Streams(ES) file without any restrictions. The target video format further includes an image data file, etc.

Figure 3:
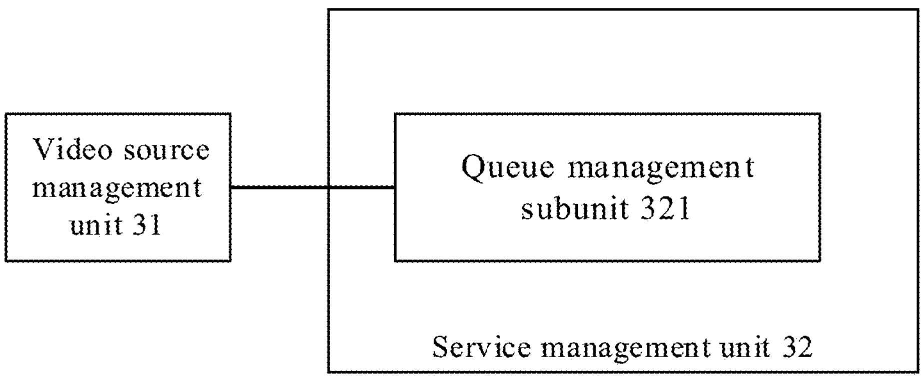
FIG. 3 is a structural block diagram of a video source transmission apparatus according to still another embodiment of the present disclosure.

In some embodiments, as shown in FIG. 3, the service management unit 32 further includes a queue management subunit 321, which is connected to the video source management unit 31. The queue management subunit 321 is specifically configured to: obtain a transmission control parameter; write sequentially each video frame in the video source to be transmitted into a tail of the circular queue and buffer the video frame based on the transmission control parameter; start transmitting sequentially the buffered video frames from a head of the circular queue, until receiving a stop transmission control instruction; and stop, based on the stop transmission control instruction, writing into the circular queue and clear the video source to be transmitted in the circular queue.

In an embodiment, the length of the circular queue is defined by the as N, and a head and a tail of the circular queue are defined by the user. A head pointer points to an address corresponding to the head of the circular queue. The head of the circular queue refers to an end of the circular queue where data is allowed to be deleted. A tail pointer points to a address corresponding to the end of the circular queue. The tail of the circular queue refers to an end of the circular queue where data is allowed to be inserted. That is to say, during the process of writing each video frame in the video source to be transmitted into the circular queue, the tail pointer points to the address corresponding to the tail of the circular queue, and the video frame in the video source to be transmitted is written into the address corresponding to the tail of the circular queue; the head pointer points to the address corresponding to the head of the circular queue, and the video frame stored in the address corresponding to the head of the circular queue is transmitted to the external host device 7. Therefore, using a circular queue to buffer the video source can reuse memory, which is beneficial for saving memory space.

In addition, when the head pointer catches up with the head pointer, an empty queue appears. When the head pointer catches up with the tail pointer, a full queue appears. At this time, it is necessary to wait for entry into or exit from the queue, and the head and tail of the queue move relative to each other.

Figure 4:
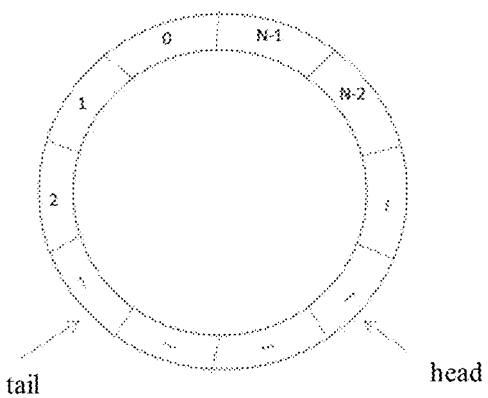
FIG. 4 is a schematic diagram of a circular queue according to an embodiment of the present disclosure.

Specifically, the queue management subunit 321 obtains the transmission control parameter entered by the user through the external host device 7, and the transmission control parameter includes at least a frame interval. As shown in FIG. 4, based on the transmission control parameter, each video frame in the video source to be transmitted is written sequentially into a tail of the circular queue and buffered. That is, the speed of writing each video frame into the circular queue is controlled by the transmission control parameter selected by the user using the external host device 7. The buffered video frames are transmitted sequentially from a head of the circular queue. That is, the buffered video frames are sequentially transmitted from the head of the circular queue based on the transmission control parameter. After the video frames in the video source to be transmitted in the circular queue are transmitted during the transmission process, the remaining video frames in the video source to be transmitted are written into the circular queue based on the transmission control parameter so that the buffered video frames in the circular queue will not be saturated or insufficient, until the stop transmission control instruction entered by the user through the external host device 7 is received. Based on the stop transmission control instruction, the queue management subunit controls to stop writing into the circular queue and clears the video source to be transmitted in the circular queue. Therefore, in this disclosure, based on the different frame intervals of different video sources, the queue management subunit 321 in this disclosure controls, through the transmission control parameter (i.e., the frame interval) selected by the user using the external host device 7, the speed at which each video frame is written to the circular queue. That is, for different video sources, the speed at which each video frame is written into the circular queue is controlled by the selected frame interval (which is the speed at which video frames are read), so that the circular queue will not be saturated or insufficient. In other words, the circular queue will not become an empty or full queue, and the remaining video frames in the video source to be transmitted can be continuously inserted into the circular queue, thereby avoiding the problems of video source lag and loss caused by the influence of reading speed. In addition, only the head and tail pointers are moved during the operations of the video frame entry into or exit from the queue, thereby achieving a high CPU service efficiency and improving the processing efficiency of ping-pong or data sending and receiving threads to the full extent. The head and the tail of the circular queue are connected, and the head and the tail move relative to each other in the operations of entry into or exit from the queue.

In some embodiments, the service management unit 32 further includes an encoding management subunit, the transmission control parameter includes a target video encoding format. The encoding management subunit is specifically configured to. obtain the target video encoding format selected by the user; obtain one or more supported video encoding formats of the video source transmission apparatus; determine presence of the target video encoding format in the one or more supported video encoding formats; and encode the video source to be transmitted based on the target encoding format.

Specifically, the external host device 7 obtains all video encoding formats supported by the video source transmission apparatus through enumeration and displays them on the screen of the external host device 7, so as to cause the user can choose a video encoding format through the screen of the external host device 7. The external host device 7 receives the target video coding format selected by the user and sends it to the coding management subunit of the video source transmission apparatus. The encoding management subunit can obtain the target video encoding format selected by the user, can obtain the video encoding format(s) supported by the video source transmission apparatus and can determine the presence of a target video encoding format in the supported video encoding format(s), so as to encode the video source to be transmitted based on the target encoding format and thus to convert the format of the video source to be transmitted into the target video encoding format. Therefore, the video source to be transmitted is encoded based on the target video encoding format selected by the user, so as to ensure the transmission of the video source.

In addition, the video encoding formats can be YUYV, Motion Joint Photographic Experts Group (MJPEG, i.e., the technology being a moving still image (or frame by frame) compression technology), H264, etc., there is no restriction on this. The UVC driver supports a framebased format of H264. For example, if the target video encoding format is H264 and the initial video source format is YUYV, the initial video source will be encoded based on the target encoding format to convert the initial video source format into the target encoding format. It should be noted that after the user selects the target video encoding format using the external host device 7, the video source transmission apparatus needs to transmit a video source to be transmitted that is in the same target video encoding format.

In some embodiments, the service management unit 32 further includes a driver management subunit. The driver management subunit is specifically configured to control an open-closed status of a video channel after receiving the transmission control instruction. That is to say, the driver management subunit controls the open-closed status of the video channel after receiving the transmission control command input by the user through the screen of the external host device 7. For example, if the transmission control command input by the user through the screen of the external host device 7 is a start transmission control command, the video channel is controlled to open. If the transmission control command input by the user through the screen of the external host device 7 is a stop transmission control command, the video channel is controlled to close, thereby achieving control over the transmission of the video source.

In some embodiments, the video channel is a UVC channel. That is, the video source transmission apparatus is connected to the external host device 7 through a USB cable to establish a UVC channel. The UVC channel uses the UVC protocol to transmit data, and the video source to be transmitted in the circular queue is sequentially transmitted through the UVC channel. The speed at which each video frame is written into the circular queue is controlled by selected transmission control parameters. The buffered video frames are sequentially transmitted to the UVC channel from the head of the circular queue, so that the UVC channel obtains the buffered video frames from the head of the circular queue based on the transmission control parameter (i.e., a fixed frame interval), so that the video source in the circular queue will not be insufficient or overstocked, so as to avoid the problems of video source lag and loss due to the influence of the read speed.

In some embodiments, the transmission management unit 33 is further configured to execute, before receiving the transmission control instruction, apparatus enumeration instruction to detect an external host device 7 connected to the video source transmission apparatus. The external host device 7 controls the transmission management unit 33 to execute the device enumeration instruction, and the external host device 7 obtains the transmission control parameters supported by the video source transmission apparatus and displays them on the screen of the external host device 7. For example, the transmission control parameter can be a frame interval. The user can select the transmission control parameter through the screen of the external host device 7. The external host device 7 then transmits the transmission control parameter to the transmission management unit 33 of the video source transmission apparatus through the video channel. The transmission management unit 33 can receive the transmission control parameters provided by the external host device 7. Therefore, in the present disclosure, the speed at which each video frame is written into the circular queue can be controlled by the transmission control parameter (i.e. the frame interval) selected by the user using the external host device 7. That is, for different video sources, the speed at which each video frame is written to the circular queue is controlled by the selected frame interval (which is the speed at which video frames are read), so that the circular queue will not be saturated or insufficient. In other words, the circular queue will not become an empty or full queue, and the remaining video frames in the video source to be transmitted can be continuously inserted into the circular queue, thereby avoiding the problems of video source lag and loss caused by the influence of reading speed.

In some embodiments, the video source transmission apparatus further includes a data transmission interface. The data transmission interface has one end that is connected to the control module 3, and another end that is suitable to be connected to an external host device 7 through a data connection cable. Based on this design, the external host device 7 is connected to the control module 3 through the data connection cable and the data transmission interface, so that the control module 3 can send the video source to be transmitted to the external host device 7 through the data connection cable and the data transmission interface.

In some embodiments, the data transmission interface is a USB transmission interface or other interface, which is not restricted.

Figure 5:
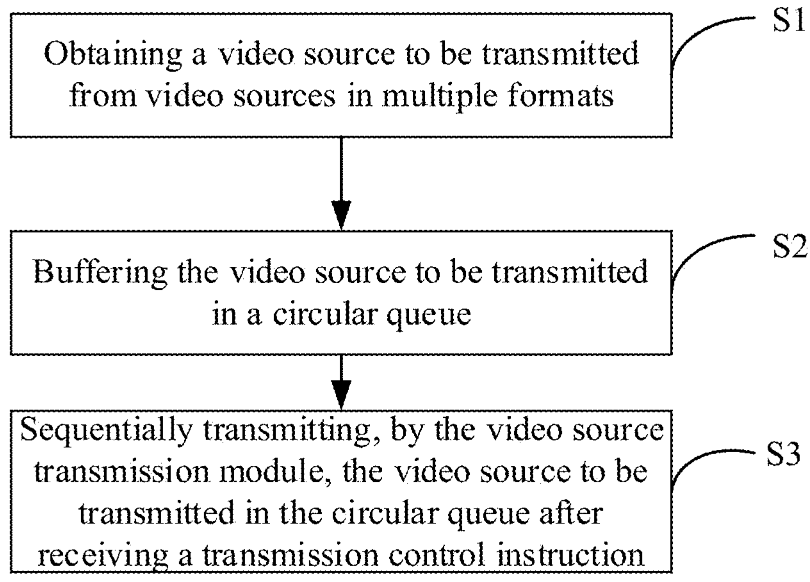
FIG. 5 is a flowchart of a video source transmission method according to an embodiment of the present disclosure.

A video source transmission method is provided in an embodiment of the second aspect of the present disclosure. As shown in FIG. 5, the method includes at least steps S1 to S3.

At step S1, a video source to be transmitted is obtained from video sources in multiple formats.

Specifically, the video source acquisition module captures in real-time video sources in multiple formats, or the video source acquisition module 1 stores video sources in multiple formats. The format of the video source can be static or dynamic image data, video data, etc., there is no restriction on this.

At step S2, the video source to be transmitted is buffered in a circular queue.

Specifically, during the video source transmission apparatus is transmitting the video source to an external host device, video frames in the video source to be transmitted are written into a circular queue.

At step S3, the video source to be transmitted in the circular queue is sequentially transmitted by the video source transmission module after a transmission control instruction is received.

Specifically, in related technologies, a ping-pong buffering mechanism is used to achieve the transmission of a video source. That is, each video frame in the video source is allocated to two data buffer regions, and is transmitted to a USB Video Class (UVC) channel established by a video source transmission apparatus and an external host device through two data buffer regions, and then is written into two data buffer regions. However, with the transmission method of the video frames mentioned above, it is difficult for the video frames to be written into the data buffer regions timely when the UVC channel quickly obtains the video source in the data buffer regions, resulting in the problem of video source lagging. Furthermore, it causes the problem of video source loss when the UVC channel reads slowly the video source in the data buffer regions. In order to solve this problem, in the present disclosure, the video source to be transmitted is buffered in the form of a circular queue, and the video source to be transmitted in the circular queue is transmitted sequentially, instead of buffering the video source through the data buffer regions, so as to avoid the problem of video source lag and loss caused by the influence of reading speed. That is to say, after the video source transmission apparatus receives the transmission control instruction input by the user through the external host device, the video source transmission apparatus transfers the video source to the external host device, that is, the video frames in the video source to be transmitted are written into the circular queue, and then the video source to be transmitted in the circular queue is sequentially transmitted to the external host device. During the transmission process, after the video frames in the video source to be transmitted in the circular queue are transmitted, the remaining video frames in the video source to be transmitted are written into the circular queue. When the external host device reads the video frames quickly, it increases the speed at which the video frames are written to the circular queue. When the external host device reads the video frames slowly, it slows down the speed at which the video frames are written to the circular queue. In this way, the video frames buffered in the circular queue will not become saturated or insufficient. Therefore, compared to the method of realizing video source transmission through the ping-pong buffering mechanism in which two data buffer areas are used to buffer the video source to be transmitted, the video source transmission in this application is realized through circular queue, so that the speed at which video frames are written into the circular queue can be adjusted adaptively in consideration of the reading speed and the video frames buffered in the circular queue will not be saturated or insufficient so as to avoid the problems of video source lag and loss caused by the influence of reading speed and to improve the work efficiency and flexibility, facilitate the rapid docking of development utility programs. In addition, the memory can be reused when the video source is buffered in the circular queue, which is conducive to saving memory space and to maximize the threading efficiency of video source transmission. In addition, a circular queue is a queue that reuses queue space, and the head and tail of the circular queue are connected.

According to the video source transmission method of the embodiment of the disclosure, during the process of the video source transmission apparatus transmitting the video source to be transmitted to an external host device, the video frames in the video source to be transmitted are written into a circular queue, and then the buffered video frames in the circular queue are transmitted to the external host device. In other words, when the video source to be transmitted is transmitted, it no longer buffers the video frames of the video source to be transmitted in two data buffer regions, but writes the video frames in the video source into the circular queue, and adaptively adjusts the speed of writing the video frames into the circular queue in consideration of the reading speed of the external host device. Therefore, compared to the method of realizing video source transmission through the ping-pong buffering mechanism, the video source transmission apparatus in the present disclosure adaptively adjusts the speed of writing video frames into the circular queue in consideration of the reading speed, so that the video frames buffered in the circular queue will not be saturated or insufficient, so as to avoid the problems of video source lag and loss caused by the influence of reading speed.

In some embodiments, the buffering the video source to be transmitted in the circular queue and the sequentially transmitting the video source to be transmitted in the circular queue, include: obtaining a transmission control parameter; based on the transmission control parameter, writing sequentially each video frame in the video source to be transmitted into a tail of the circular queue and buffering the video frame; starting transmitting sequentially the buffered video frames from a head of the circular queue, until receiving a stop transmission control instruction, stopping, based on the stop transmission control instruction, writing into the circular queue and clearing the video source to be transmitted in the circular queue. Specifically, the transmission control parameter entered by the user through the external host device is obtained, and the transmission control parameter includes at least a frame interval. As shown in FIG. 4, based on the transmission control parameter, each video frame in the video source to be transmitted is written sequentially into a tail of the circular queue and buffered. That is, the speed of writing each video frame into the circular queue is controlled by the transmission control parameters selected by the user using the external host device. The buffered video frames are transmitted sequentially from a head of the circular queue. That is, the buffered video frames are sequentially transmitted from the head of the circular queue based on the transmission control parameter. After the video frames in the video source to be transmitted in the circular queue are transmitted during the transmission process, the remaining video frames in the video source to be transmitted are written into the circular queue based on the transmission control parameter so that the buffered video frames in the circular queue will not be saturated or insufficient, until the stop transmission control instruction entered by the user through the external host device is received. Based on the stop transmission control instruction, the queue management subunit controls to stop writing into the circular queue and clears the video source to be transmitted in the circular queue. Therefore, in this disclosure, based on the different frame intervals of different video sources, the speed at which each video frame is written to the circular queue is controlled through the transmission control parameter (i.e., the frame interval) selected by the user using the external host device. That is, for different video sources, the speed at which each video frame is written into the circular queue is controlled by the selected frame interval (which is the speed at which video frames are read), so that the circular queue will not be saturated or insufficient. In other words, the circular queue will not become an empty or full queue, and the remaining video frames in the video source to be transmitted can be continuously inserted into the circular queue, thereby avoiding the problems of video source lag and loss caused by the influence of reading speed. In addition, only the head and tail pointers are moved during the operations of the video frame entry into or exit from the queue, thereby achieving a high CPU service efficiency and improving the processing efficiency of ping-pong or data sending and receiving threads to the full extent. The length of the circular queue can be self-defined. The head and the tail of the circular queue are connected, and the head and the tail move relative to each other in the operations of entry into or exit from the queue.

Figure 6:
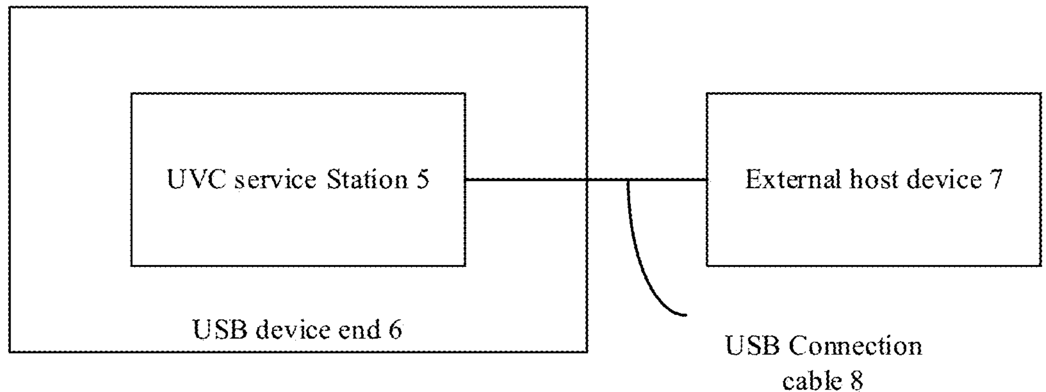
FIG. 6 is a schematic diagram of connection between a video source transmission apparatus and an external host device according to an embodiment of the present disclosure.

In an embodiment, the video source transmission apparatus can be a Universal Serial Bus (USB) device end. As shown in FIG. 6, a UVC service station (Service) 5 of the USB device end 6 is connected to the external host device 7. When the UVC service station 5 captures a video source, it sends the video source to the external host device 7 through the USB connection cable 8 so as to enable the external host device 7 to obtain the video source, thereby ensuring that the external host device 7 can decode or preview the video source and perform related functions. In addition, the USB device end includes a USB driver, a Gadget (gadget) driver, and a UDC, and provides UVC device with enumeration and transmission through the USB EP (Endpoint). In the embodiment, the UVC service station not only takes charge of the acquisition of video sources and management of the USB device end, but also supports building pipelines and circular queue management.

In addition, the external host device can be a Windows/Linux/Android/Mac operating system, and external host device has a UVC driver.

In some embodiments, the external host device obtains all video encoding formats supported by the video source transmission apparatus through enumeration and displays them on the screen of the external host device, so as to cause the user can choose a video encoding format through the screen of the external host device. The external host device receives the target video coding format selected by the user and sends it to the video source transmission apparatus. The video source transmission apparatus can obtain the target video encoding format selected by the user, can obtain the video encoding formats supported by the video source transmission apparatus and can determine the presence of a target video encoding format in the supported video encoding formats, so as to encode the video source to be transmitted based on the target encoding format and thus to convert the format of the video source to be transmitted into the target video encoding format and determine a coded initial video source as the video source to be transmitted. Therefore, the video source to be transmitted is encoded based on the target video encoding format, so as to ensure the transmission of the video source.

In addition, the video encoding formats can be YUYV, Motion Joint Photographic Experts Group (MJPEG, i.e., the technology being a moving still image (or frame by frame) compression technology), H264, etc., there is no restriction on this. The UVC driver supports a framebased format of H264. For example, if the target video encoding format is H264 and the initial video source format is YUYV, the initial video source will be encoded based on the target encoding format to convert the initial video source format into the target encoding format. It should be noted that after the user selects the target video encoding format using the external host device, the video source transmission apparatus needs to transmit a video source to be transmitted that is in the same target video encoding format.

In an embodiment, the transmission of the video source can be tested by printing a time stamp of a Log.

In some embodiments, the external host device detects video resolutions supported by the video source transmission apparatus through enumeration and displays them on the screen of the external host device, so as to enable the user to choose a video resolution through the external host device. The external host device receives the target video resolution selected by the user. The video source transmission apparatus can obtain the target video resolution selected by the user, obtain the initial video source and switch the resolution of the initial video source based on the target video resolution. For example, if the target video resolution is 1080P and the resolution of the initial video source is 4K, the resolution of the initial video source is scaled from 4K to 1080, and the switched initial video source is used as the video source to be transmitted. Thus, the resolution of the initial video source is switched according to the target video resolution, so that the transmission of the video source can be ensured.

In addition, after the external host device successfully enumerates the video source transmission apparatus, the external host device can control the transmission of the video source through a corresponding application or command.

In the embodiment, there is no restriction on the sequence of switching the resolution of the initial video source and encoding the initial video source. The resolution of the initial video source can be switched first based on the target video resolution, and then the initial video source can be encoded based on the target encoding format to obtain the video source to be transmitted. Therefore, for different video sources corresponding to different frame intervals, different video coding formats and different video resolutions, the transmission control parameters such as a frame interval, a target video coding format and a target video resolution, are selected via the external host device in this application. In this way, the video source to be transmitted can be transmitted and processed based on the frame interval, the target video coding format and the target video resolution selected by the user, so as to ensure the transmission of the video source to be transmitted and thus to avoid the problem of the video source lag or video source exit due to error.

In some embodiments, the video source transmission apparatus is connected to the external host device through a USB connection cable to establish a UVC channel. The UVC channel uses the UVC protocol to transmit data, and the video source to be transmitted in the circular queue is sequentially transmitted through the UVC channel. The speed at which each video frame is written into the circular queue is controlled by selected transmission control parameters. The buffered video frames are sequentially transmitted to the UVC channel from the head of the circular queue, so that the UVC channel obtains the buffered video frames from the head of the circular queue based on the transmission control parameter (i.e., a fixed frame interval), so that the video source in the circular queue will not be insufficient or overstocked, so as to avoid the problems of video source lag and loss due to the influence of the read speed.

In some embodiments, the video source transmission apparatus obtains the transmission status of the video source to be transmitted, and then controls the UVC channel to be closed after determining that the transmission status of the video source to be transmitted is abnormal, so as to stop the transmission of the video source to be transmitted. The abnormal status is that the external host device has a jam problem, the external host device forcibly shuts down the playing of the video source, the enumeration process is abnormal, or the transmission is abnormal. In addition, when the video source transmission status is abnormal, the external host device obtains the video source abnormally.

Figure 7:
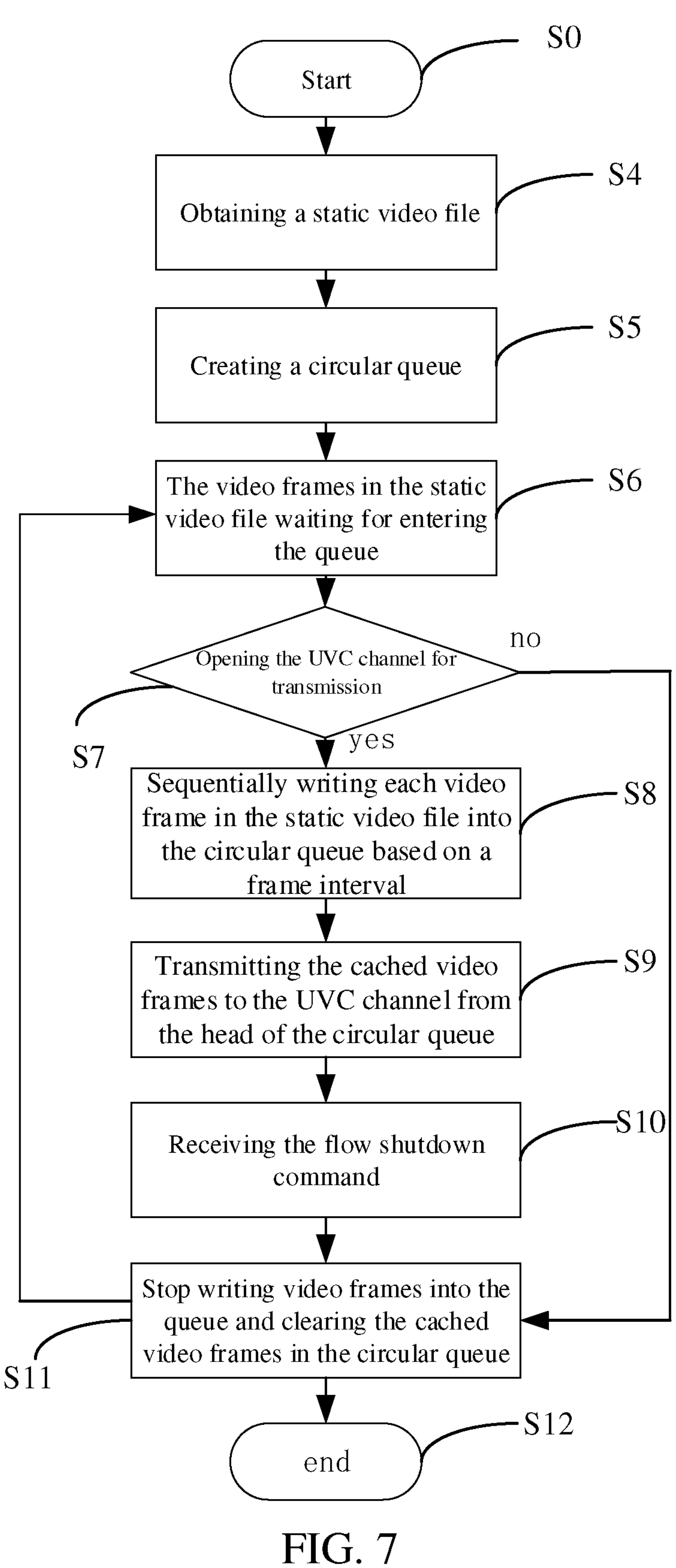
FIG. 7 is a flowchart of a video source transmission method according to another embodiment of the present disclosure.

An example of a video source transmission method according to an embodiment of the present disclosure will be described below with reference to FIG. 7. The specific content is as follows.

At step S0, the method is started.

At step S4, a static video file is obtained. The static video file can be an ES file.

At step S5, a circular queue is created.

At step S6, video frames in the static video file wait for entering the queue.

At step S7, it is determined whether to open a UVC channel for transmission. If the determination result is "yes", the method proceeds to step S8. Otherwise, the method proceeds to step S11.

At step S8, each video frame in the static video file is sequentially written into the circular queue based on a transmission control parameter (i.e., a frame interval) selected by the user using the external host device. That is, the speed at which each video frame is written into the circular queue is controlled by the read speed of the external host device.

At step S9, the buffered video frames are transmitted to the UVC channel from the head of the circular queue, and then the UVC transmits sequentially the received video frames to external host devices in turn.

At step S10, a stop transmission control instruction entered by the user through the external host device, i.e., a flow shutdown instruction, is received.

At step S11, it stops writing video frames in the static video file into the queue and clears the buffered video frames in the circular queue, and the step S6 is executed.

At step S12, the method ends.

In summary, in this application, the UVC channel is opened after receiving the start transmission control instruction i.e., an open stream instruction. The speed at which each video frame is written into the circular queue is controlled based on the transmission control parameter (i.e., a frame interval) selected by the user on the external host device. That is, for different video sources, the speed at which each video frame is written into the circular queue is controlled by the selected frame interval (which is the speed at which video frames are read), so that the circular queue will not be saturated or insufficient. In other words, the circular queue will not become an empty or full queue, and the remaining video frames in the video source to be transmitted can be continuously inserted into the circular queue, thereby avoiding the problems of video source lag and loss caused by the influence of reading speed. In addition, after receiving the stop transmission control command i.e., the flow shutdown command, it controls the video frame to be stopped from being written into the circular queue and the video source to be transmitted in the circular queue is cleared.

Figure 8:
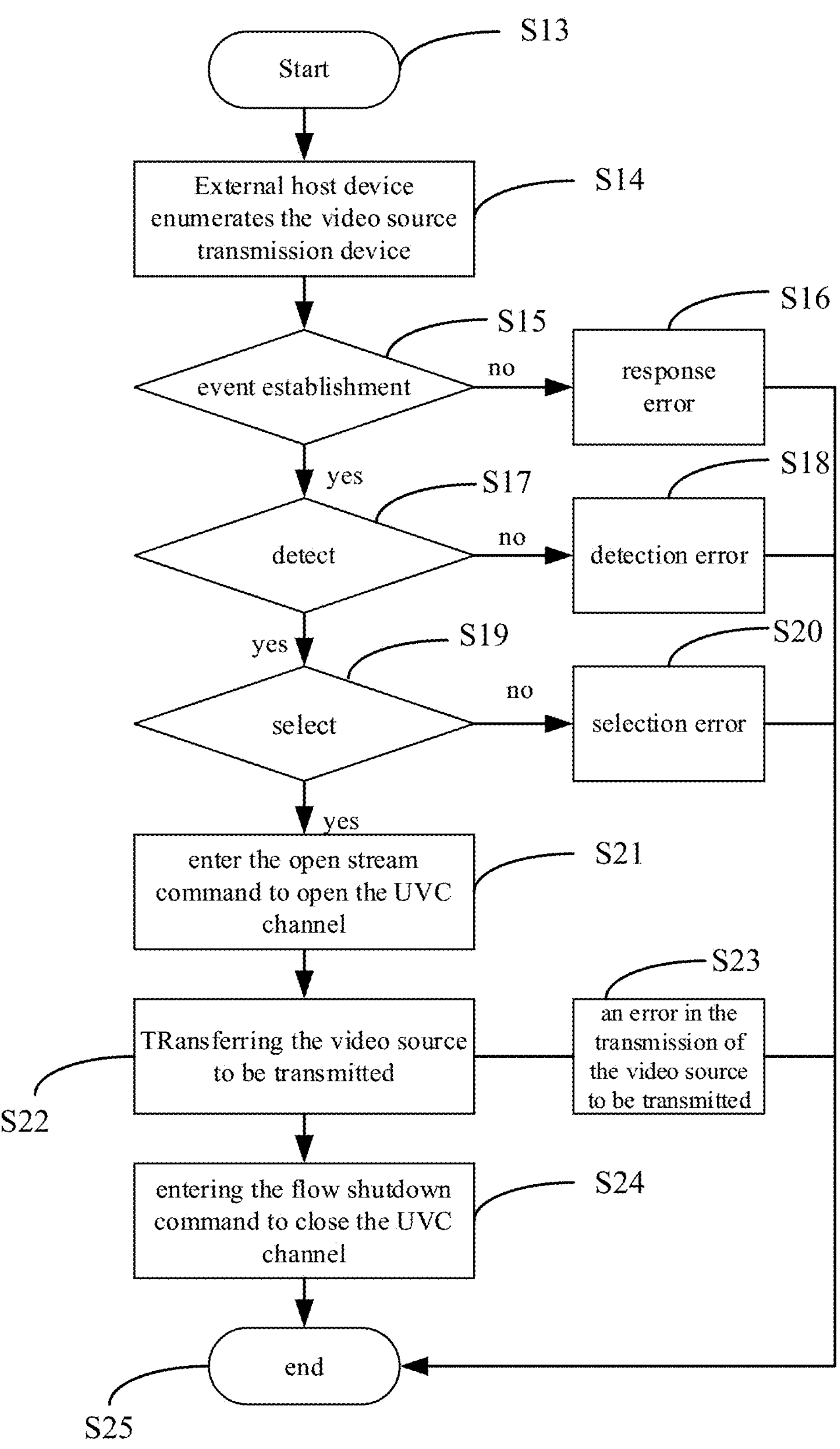
FIG. 8 is a flowchart of a video source transmission method according to still another embodiment of the present disclosure.

An example of a video source transmission method according to an embodiment of the present disclosure will be described below with reference to FIG. 8. The specific content is as follows.

At step S13, the method is started.

At step S14, a user triggers an enumeration request through an external host device, and the external host device 7 enumerates video encoding formats and video resolutions supported by the video source transmission apparatus.

At step S15, it is determined whether a USB event has been established. If the determination result is "yes", the method proceeds to step S17. Otherwise, the method proceeds to step s16.

At step S16, the external host device responds improperly, and step S25 is executed.

At step S17, it is determined whether the external host device has detected all video encoding formats, video resolutions, and transmission control parameters (i.e. frame intervals) supported by the video source transmission apparatus. If the determination result is "yes", the method proceeds to step S19. Otherwise, the method proceeds to step S18.

At step S18, the external host device encounters an error when detecting the video encoding formats, video resolutions, and transmission control parameters (i.e., frame intervals) supported by the video source transmission apparatus, the method proceeds to step S25.

At Step S19, it is determined whether there is a selection error in the target encoding format, the target video resolution, and the transmission control parameter selected by the user through a relevant video playback software on the external host device. If the determination result is "yes", the method proceeds to step S21. Otherwise, the method proceeds to step S20.

At Step S20, an error occurs when the external host device selects the target encoding format, the target video resolution, and the transmission control parameter, and the method proceeds to step S25.

At Step S21, the user inputs an open stream command through the relevant video playback software on the external host device to control the opening of the UVC channel.

At Step S22, based on the transmission control parameter (i.e., a frame interval) selected by the user on the external host device, each video frame in the video source to be transmitted is sequentially written into the circular queue. The speed of writing each video frame into the circular queue is controlled by the read speed of the external host device. The buffered video frames are transmitted to the UVC channel from the head of the circular queue, and the video frames in the video resource to be transmitted that are received by the UVC channel are then transmitted to the external host device.

At Step S23, if there is an error in the transmission of the video source to be transmitted, the method proceeds to step S25.

At Step S24, the user inputs a stop transmission control command i.e., a flow shutdown command, through a relevant audio playback software on the external host device to control the closure of the UVC channel and stop transmitting the video source to be transmitted to the external host device 7.

At Step S25, the method ends.

Therefore, for different video sources corresponding to different frame intervals, different video coding formats and different video resolutions, the external host device in this application selects the transmission control parameters such as a frame interval, a target video coding format and a target video resolution, so as to control the transmission of the video source to be transmitted at the frame interval selected by the user. In this way, the circular queue will not be insufficient or overstocked. In other words, the circular queue will not be an empty queue or a full queue, and the remaining video frames in the video source to be transmitted can be continuously inserted into the circular queue, thereby avoiding the problems of video source lag and loss caused by the influence of reading speed. Before each video frame in the video source to be transmitted is written into the circular queue, the video source to be transmitted is processed based on the target video encoding format and the target video resolution so as to ensure the transmission of the video source to be transmitted, thereby avoiding the problem of video source lag or video source exit due to an error during the video source is being played.

An embodiment in a third aspect of the present disclosure provides a non-transitory computer storage medium having a computer program stored thereon. The computer program when executed by a processor, implements the video source transmission method described in any of the above embodiments.

In the specification of the disclosure, any processor method described in a flow chart or described herein in other ways may be understood to include one or more modules, segments or portions of codes of executable instructions for achieving specific logical functions or steps in the process, and the scope of a preferred embodiment of the disclosure includes other implementations, which may not be performed in the order shown or discussed, including in a substantially simultaneous manner or in a reverse order according to involved functions, and should be understood by those skilled in the art.

An embodiment in a fourth aspect of the present disclosure provides a video source transmission apparatus including a processor and a memory. The memory is configured to store a computer program, and the processor is configured to invoke and run the computer program stored in the memory to perform the operations of the video source transmission apparatus in any of the embodiments in the first aspect of the present disclosure, and/or the steps of the video source transmission method in any of the embodiments in the second aspect of the present disclosure. Details thereof are omitted here for simplicity.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" maybe any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firm-ware or their combination, In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application specific integrated circuit having an appropriate combination logic gate circuit, a programmable gate array (PGA), a field programmable gate array (FPGA), etc.

Those skilled in the art shall understand that all or parts of the steps in the above exemplifying method of the disclosure may be achieved by commanding the related hardware with programs. The programs may be stored in a computer readable storage medium, and the programs comprise one or a combination of the steps in the method embodiments of the disclosure when run on a computer.

In addition, each function cell of the embodiments of the disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although the embodiments of the disclosure have been shown and described above, it should be understood that the above embodiments are exemplary and should not be construed as limiting the disclosure. Those skilled in the art may change, modify, and substitute the embodiments within the scope of the disclosure.

Reference throughout this specification to "an embodiment", "some embodiments", "one embodiment", "another example", "an example", "a specific example", or "some examples" means that a particular feature, structure material, or characteristic described in connection with the embodiment or example is included in at least one embodiment or example of the disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. A video source transmission method, comprising:

obtaining, by a processor, a video source to be transmitted from video sources in multiple formats based on a target video format selected by a user;

buffering, by the processor, the video source to be transmitted in a circular queue; and sequentially transmitting, by the processor, the video source to be transmitted in the circular queue to an external host device after receiving a transmission control instruction from the external host device.

2. The video source transmission method according to claim 1, wherein said buffering, by the processor, the video source to be transmitted in the circular queue and said sequentially transmitting, by the processor, the video source to be transmitted in the circular queue to the external host device after receiving the transmission control instruction from the external host device, comprise:

obtaining, by the processor, a transmission control parameter;

writing sequentially, by the processor, each video frame in the video source to be transmitted into a tail of the circular queue and buffering, by the processor, the video frame based on the transmission control parameter;

starting, by the processor, transmitting sequentially the buffered video frames from a head of the circular queue, until receiving a stop transmission control instruction; and stopping by the processor, based on the stop transmission control instruction, writing into the circular queue and clearing, by the processor, the video source to be transmitted in the circular queue.

3. The video source transmission method according to claim 2, further comprising: after obtaining the video resource to be transmitted, obtaining, by the processor, a target video encoding format selected by a user;

obtaining, by the processor, one or more supported video encoding formats of a video source transmission apparatus;

determining, by the processor, presence of the target video encoding format in the one or more supported video encoding formats; and encoding, by the processor, the video source to be transmitted based on the target encoding format.

4. The video source transmission method according to claim 1, further comprising: sequentially transmitting, by the processor via a Universal Serial Bus (USB) VIDEO CLASS (UVC) channel, the video source to be transmitted in the circular queue.

5. The video source transmission method according to claim 1, further comprising:

obtaining, by the processor, a transmission state of the video source to be transmitted; and controlling by the processor, after determining that the transmission state is abnormal, a Universal Serial Bus (USB) VIDEO CLASS (UVC) channel to be closed to stop the transmission of the video source to be transmitted.

6. The video source transmission method according to claim 1, further comprising: before receiving the transmission control instruction, executing, by the processor, apparatus enumeration instruction to detect the external host device connected to a video source transmission apparatus; and receiving, by the processor, a transmission control parameter provided by the external host device.

7. A video source transmission apparatus, comprising:

a processor; and a memory, wherein the memory is configured to store a computer program, and the processor is configured to invoke and run the computer program stored in the memory to:

obtain a video source to be transmitted from video sources in multiple formats based on a target video format selected by a user;

buffer the video source to be transmitted in a circular queue; and sequentially transmit, after receiving a transmission control instruction from an external host device, the video source to be transmitted in the circular queue to the external host device.

8. The video source transmission apparatus according to claim 7, wherein the target video format comprises at least a dynamic image, a static image, and a static video file.

9. The video source transmission apparatus according to claim 7, wherein the processor is further configured to invoke and run the computer program stored in the memory to:

obtain a transmission control parameter;

write sequentially each video frame in the video source to be transmitted into a tail of the circular queue and buffer the video frame based on the transmission control parameter;

start transmitting sequentially the buffered video frames from a head of the circular queue, until receiving a stop transmission control instruction; and stop, based on the stop transmission control instruction, writing into the circular queue and clear the video source to be transmitted in the circular queue.

10. The video source transmission apparatus according to claim 9, wherein the processor is further configured to invoke and run the computer program stored in the memory to:

obtain the target video encoding format selected by the user;

obtain one or more supported video encoding formats of the video source transmission apparatus;

determine presence of the target video encoding format in the one or more supported video encoding formats; and encode the video source to be transmitted based on the target encoding format.

11. The video source transmission apparatus according to claim 10, wherein the processor is further configured to invoke and run the computer program stored in the memory to control an open-closed status of a video channel after receiving the transmission control instruction.

12. The video source transmission apparatus according to claim 11, wherein the video channel is a Universal Serial Bus (USB) VIDEO CLASS (UVC) channel.

13. The video source transmission apparatus according to claim 7, wherein the processor is further configured to invoke and run the computer program stored in the memory to execute, before receiving the transmission control instruction, apparatus enumeration instruction to detect the external host device and to receive a transmission control parameter provided by the external host device.

14. A non-transitory computer storage medium having a computer program stored thereon, wherein the computer program when executed by a processor, implements operations of:

obtaining a video source to be transmitted from video sources in multiple formats based on a target video format selected by a user;

buffering the video source to be transmitted in a circular queue; and sequentially transmitting the video source to be transmitted in the circular queue to an external host device after receiving a transmission control instruction from the external host device.

15. The non-transitory computer storage medium according to claim 14, wherein said buffering the video source to be transmitted in the circular queue and said sequentially transmitting the video source to be transmitted in the circular queue to the external host device after receiving the transmission control instruction from the external host device, comprise:

obtaining a transmission control parameter;

writing sequentially each video frame in the video source to be transmitted into a tail of the circular queue and buffering the video frame based on the transmission control parameter;

starting transmitting sequentially the buffered video frames from a head of the circular queue, until receiving a stop transmission control instruction; and stopping, based on the stop transmission control instruction, writing into the circular queue and clearing the video source to be transmitted in the circular queue.

16. The non-transitory computer storage medium according to claim 15, wherein the computer program when executed by a processor, further implements operations of:

obtaining a target video encoding format selected by a user;

obtaining one or more supported video encoding formats of a video source transmission apparatus;

determining presence of the target video encoding format in the one or more supported video encoding formats; and encoding the video source to be transmitted based on the target encoding format.

17. The non-transitory computer storage medium according to claim 14, wherein the computer program when executed by a processor, further implements operations of:

obtaining a transmission state of the video source to be transmitted; and controlling, after determining that the transmission state is abnormal, a Universal Serial Bus (USB) VIDEO CLASS (UVC) channel to be closed to stop the transmission of the video source to be transmitted.

* * * * *